United States Patent
Lindgren et al.

[11] Patent Number: 6,154,584
[45] Date of Patent: Nov. 28, 2000

[54] OPTICAL ANALYZER WITH VARIABLE ATTENUATORS AT INPUTS AND OUTPUTS

[75] Inventors: Bert A. Lindgren, Decatur, Ga.; R. James Bateman, New Milford, Conn.

[73] Assignee: Lan-Hopper Systems, Inc., Atlanta, Ga.

[21] Appl. No.: 09/243,764

[22] Filed: Feb. 3, 1999

[51] Int. Cl.[7] .................................................. G02B 6/26
[52] U.S. Cl. ........................ 385/16; 385/17; 385/24; 385/140
[58] Field of Search ............................. 385/16–24, 140; 356/73.1; 359/119, 283, 341

[56] References Cited

U.S. PATENT DOCUMENTS

| | | | |
|---|---|---|---|
| 4,799,789 | 1/1989 | Tsukamoto et al. | 356/73.1 |
| 4,893,006 | 1/1990 | Wakai et al. | 250/227 |
| 4,960,989 | 10/1990 | Liebenrood et al. | 250/227 |
| 5,353,147 | 10/1994 | Gimes | 359/173 |
| 5,589,933 | 12/1996 | Osgood et al. | 356/73.1 |
| 5,619,321 | 4/1997 | Artiglia et al. | 356/73.1 |
| 5,995,259 | 11/1999 | Meli et al. | 385/24 X |

*Primary Examiner*—Phan T. H. Palmer
*Attorney, Agent, or Firm*—Needle & Rosenberg, P.C.

[57] ABSTRACT

An apparatus for controlling attenuation of optical signals routed through a matrix switch capable of optically coupling a selected transmission station of a plurality of transmission stations to a first port and optically coupling a second port to a reception station includes a first variable attenuator that is optically coupled to the first port so that an optical path length exists between the first variable attenuator and the transmission station. The apparatus includes an optical analyzer that has an input port and an output port. The input port is optically coupled to the variable attenuator and the output port is optically coupled to the second port. Thus, the input port is coupled to the first port through the first variable attenuator. A control unit controls the first variable attenuator so as to cause an optical signal passing therethrough to be attenuated by a predetermined amount based on the optical path length between the transmission station and the first variable attenuator so that the optical signal entering the input port has a signal strength within a predetermined range.

16 Claims, 3 Drawing Sheets

OPTICAL ANALYZER WITH VARIABLE ATTENUATORS AT INPUTS AND OUTPUTS

BACKGROUND OF THE INVENTION

1. Field of the Invention

The present invention relates to optical communications devices and, more specifically, to a device that compensates for different optical path lengths in an optical communications system.

2. Description of the Prior Art

In recent years, optical communication systems have become increasingly common. A simple optical communication system would include a first station and, at some distance away, a second station. An optical transmitter at the first station would be optically coupled to an optical receiver at the second station via an optical fiber. Likewise an optical transmitter at the second station would be optically coupled to an optical receiver at the first station. This would be a full duplex optical communications system. More complex systems include many transmitters connected to many receivers, over varying distances. In such systems, the connections between transmitters and receivers could be dynamic and effected by a matrix switch, capable of making many-to-many connections.

A typical receiver is designed to receive an optical signal having a signal strength within a predetermined range. The signal strength at the receiver is determined by the power of the transmitter and the optical path length of the optical fiber connecting the receiver to the transmitter. Each optical fiber causes a predetermined amount of attenuation per unit length of fiber. Therefore, if a long fiber is used for the connection, the natural attenuation of the optical fiber attenuates the transmitted signal so that the receiver receives a signal having a weaker signal strength than the original signal strength at the time of transmission. Receivers are generally designed to have a sensitivity so as to be able to receive an optical signal that is attenuated by a relatively long optical fiber.

When a relatively short optical fiber connects a transmitter to a receiver, an optical signal from the transmitter, being un-attenuated by a long optical fiber, could overwhelm or even damage the receiver. In such a case, an attenuator is added to the optical path between the transmitter and the receiver so that the optical signal transmitted therebetween is attenuated to the point where it has a signal strength within the range expected by the receiver.

Frequently, it is necessary to connect an optical analyzer to an optical communications system to analyze the transmission of data as it is being transferred by the system. An analyzer typically receives a signal, displays it, regenerates it to its originally transmitted signal strength, and then outputs the signal it to the receiver. If the optical path length between the transmitter and the analyzer is relatively short, then the technician must connect an attenuator to the input of the analyzer so that the signal received from the transmitter will not damage the analyzer. Likewise, if the optical path length from the analyzer to the receiver is relatively short, then the technician must connect an attenuator to the output of the analyzer, so that the regenerated signal from the analyzer will not damage the receiver.

Existing systems have the disadvantage of requiring the technician to connect attenuators when connecting an optical analyzer to an optical communications system. Existing systems also have the disadvantage of being susceptible damage when incorrect values of annenuation are employed.

SUMMARY OF THE INVENTION

The disadvantages of the prior art are overcome by the present invention which, in one aspect, is an apparatus for controlling attenuation of optical signals routed through a matrix switch capable of optically coupling a selected transmission station, of a plurality of transmission stations, to a first port and optically coupling a second port to a reception station. A first variable attenuator is optically coupled to the first port so that an optical path length exists between the first variable attenuator and the transmission station. The apparatus includes an optical analyzer that has an input port and an output port. The input port is optically coupled to the variable attenuator and the output port is optically coupled to the second port. Thus, the input port is coupled to the first port through the first variable attenuator. A control unit controls the first variable attenuator, so as to cause an optical signal passing therethrough to be attenuated by a predetermined amount based on the optical path length between the transmission station and the first variable attenuator so that the optical signal entering the input port has a signal strength within a predetermined range.

In another aspect, the invention includes a variable attenuator optically coupled to the second port. The output port of the optical analyzer is optically coupled to the variable attenuator so that the output poll is optically coupled to the second port through the second variable attenuator.

Yet another aspect of the invention is a method of attenuating an optical signal being input into an optical analyzer. An optical signal is received from a transmission station. An amount of attenuation of the optical signal that will cause the optical signal to have a signal strength within a predetermined range is determined. The optical signal is attenuated by the determined amount of attenuation, thereby generating an attenuated optical signal. The attenuated optical signal is transferred to the optical analyzer. In yet another aspect of the invention, the signal from the optical analyzer is attenuated by a predetermined amount.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
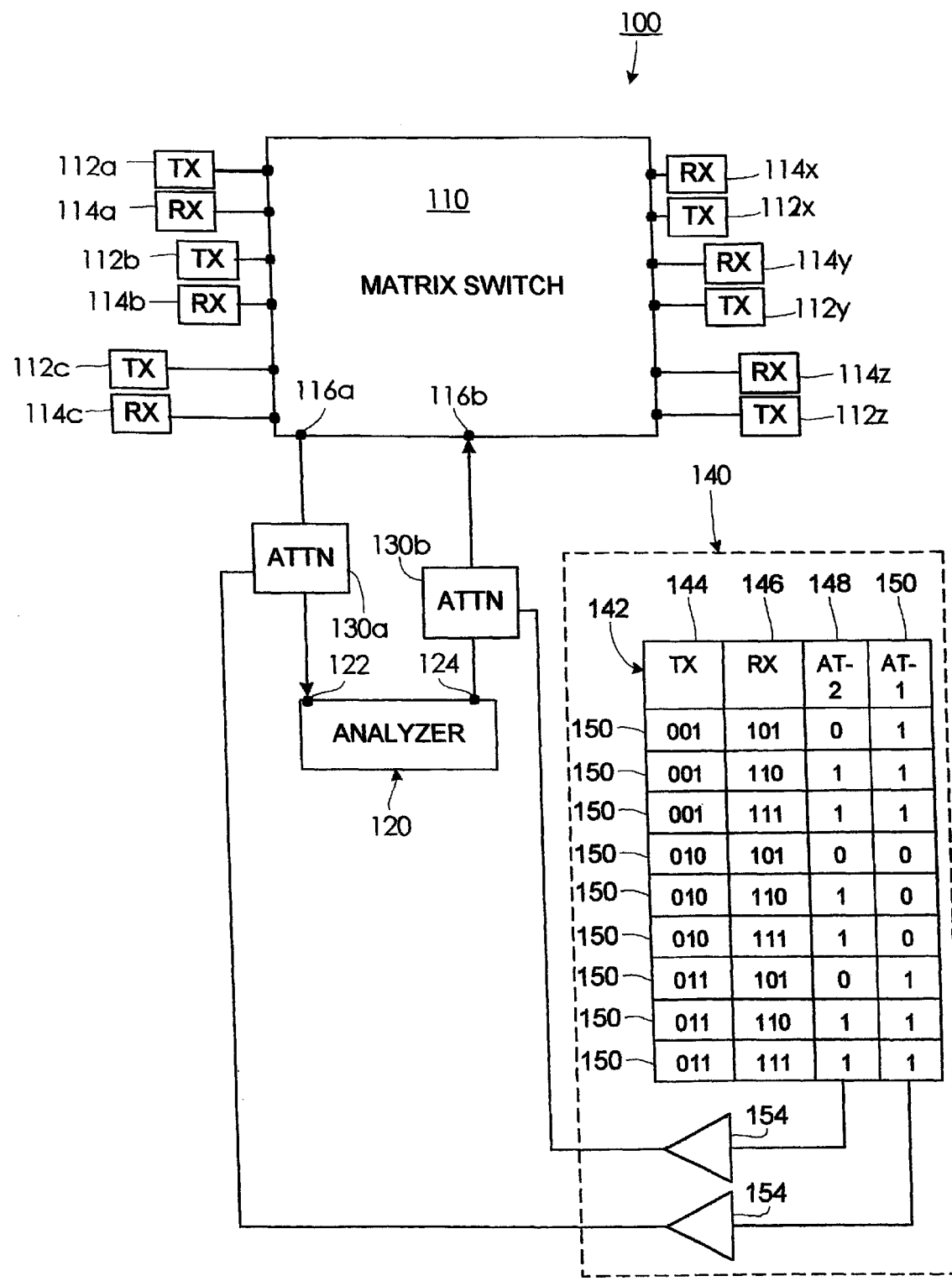
FIG. 1 is a schematic diagram of a first embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, in one embodiment, the invention is an apparatus 100 for controlling attenuation of optical signals routed through a matrix switch 110 capable of optically coupling a selected transmission station of a plurality of transmission stations 112a–12z (collectively 112) to a first port 116a and coupling a second port 116b to a selected reception station of a plurality of reception stations 114a–114z (collectively 114). (Although only a single first port 116a and a single second port 116b is shown in FIG. 1 for the sake of simplicity, actual embodiments of the matrix switch 110 could include a plurality of first ports and a plurality of second ports for use with a plurality of analyzers, without departing from the scope of the invention.) The matrix switch 110 would typically be used for connecting the transmission stations 112 directly to the reception stations 114 as part of a data communications network. For example, the matrix switch 110 could connect transmission station 112a to reception station 114y and reception station 114a to transmission station 112y as part of a duplex data transfer protocol. The matrix switch 110 could be, for example, a matrix switch produced by LanHopper Systems, Inc., 330 Research Ct., Suite 250, Norcross, Ga. 30092.

FIG. 1 shows that the connections between the transmission stations 112 and the matrix switch 100 and the between the matrix switch 110 and the reception stations 114 have different lengths. While these differing lengths could represent physical lengths of fiber optic cable, they could also represent the optical path lengths of the connections. The optical path length, as used herein, refers to the effective optical path experienced by an optical signal as it propagates through the optical connection. While the optical path length is predominantly influenced by the physical path length, it may also be influenced by other factors, including the amount of bending of the fiber optic cable, environmental factors (such as temperature), and the existence of attenuating devices in the optical path of the optical signal.

A first variable attenuator 130a is optically coupled to the first port 116a and a second variable attenuator 130b is optically coupled to the second port. One example of a suitable choice for the variable attenuators 130a and 130b (collectively 130) includes a DiCon® FAC series attenuator (e.g., part number FAC-RS2A-9-FC-P), available from DiCon Fiberoptics, Inc., 1331 Eighth Street, Berkeley, Calif. 94710.

Connected to the attenuators 130 is an optical analyzer 120. The optical analyzer 120 has an input port 122 and an output port 124. The optical analyzer 120 could be any analyzer that receives an optical signal, performs analysis functions on the optical signal, and then outputs the optical signal. The input port 122 is optically coupled to the first variable attenuator 130a so that the input port is in optical communication with the first port 116a through the first variable attenuator 130a. The output port 124 of the optical analyzer 120 is optically coupled to the second variable attenuator 130b so that the output port 124 is in optical communication with the second port 116b through the second attenuator 130b.

The first port 116a and the second port 116b of the matrix switch 110 are provided to allow real time analysis of data transfer between the transmission stations 112 and the reception stations 114. In the example provided above, if a technician were to analyze the connection between transmission station 112a and reception station 114y, then transmission station 112a would be connected to the first port 116a via the matrix switch 110 and the second port 130b would be connected to reception station 114y via the matrix switch 110. Thus, data from transmission station 112a would be received by the analyzer 120, would be analyzed by the technician, would be regenerated by the analyzer 120 and then would be transferred to reception station 114y.

A control unit 140 controls both the first variable attenuator 130a and the second variable attenuator 130b thereby regulating the amount of attenuation that they exhibit. The control unit 140 receives information regarding any connection being made between a transmission station 112 and the first port 116a and regarding any connection being made between the second port 116b and a reception station 114. This information could be received in one of several ways. In one embodiment, the control unit 140 also controls the matrix switch 110, so that the control unit 140 automatically receives information about connections as they are being made. In another embodiment, an operator enters information into the control unit 140 regarding the connections being made. The control unit 140 determines the amount of attenuation needed to compensate for a change in attenuation caused by the introduction of the analyzer 120 to the communications protocol being effected by the analyzer 140. To do this, in one embodiment, the control unit 140 accesses a look-up table 142 that is addressable based on data describing a connection and that outputs data that indicates an amount of attenuation needed for a given connection. The look-up table 142 could be implemented on a digital computer as data stored in memory or in a file, it could also be implemented in hardware using, for example, a read-only memory. The control unit 140 sends a control signal to each of the attenuators 130 causing each to attenuate its respective optical signal by the amount deemed necessary by the control unit 140.

The look-up table 142 could be modeled as a first column 144, including data representing an identifier of each transmitter, and a second column 146, including data representing an identifier of each receiver. Each possible combination of transmitter identifier and receiver identifier is represented by a separate row 150. The look-up table 142 would also include a third column 150 including output data used to control the attenuator 130a that attenuates the signal being input to the analyzer 120 and a fourth column 148 including output data used to control the attenuator 130b that attenuates the signal being output from the analyzer 120. A pair of drivers 154 are provided to match the signal levels of the outputs 148 and 150 from the look-up table 140 to the signal levels required to control the attenuators 130.

In the example of the look-up table 140 provided above, outputs 148 and 150 would have one of two values, a logical 0 or a logical 1. This corresponds to a situation where a relatively low level of precision regarding the amount of attenuation is required. In this situation, the attenuators would be driven either to a high attenuation state or a low attenuation state, depending on the values output by the look-up table 142. In situations where greater precision is required, outputs 148 and 150 would have multi-bit values and the drivers 154 would include digital-to-analog converters.

In another embodiment, optical intensity sensors could be placed in the optical paths between the ports 116a and 116b and the analyzer 120 and would generate a signal used by the control unit 140 to dynamically determine the amount of attenuation needed. In yet another embodiment, the amount of attenuation needed could be entered into the control unit 140 by an operator. In yet another embodiment, the attenuators 130 could be controlled locally by an operator, using switches to turn attenuation on or off.

In another embodiment of the control unit 140, the matrix switch also has an electrical switch located next to each connection to a transmitter 112 or receiver 114. When a technician connects a transmitter 112 or a receiver 114 to the matrix switch, the electrical switch is set to either an "on" position or an "off" position, wherein the "on" position corresponds to a logical "1" and the "off" position corresponds to a logical "0". These logic values are then passed through to the drivers 154 whenever a corresponding transmitter 112 or receiver 114 is optically coupled to the analyzer 120.

Figure 2:
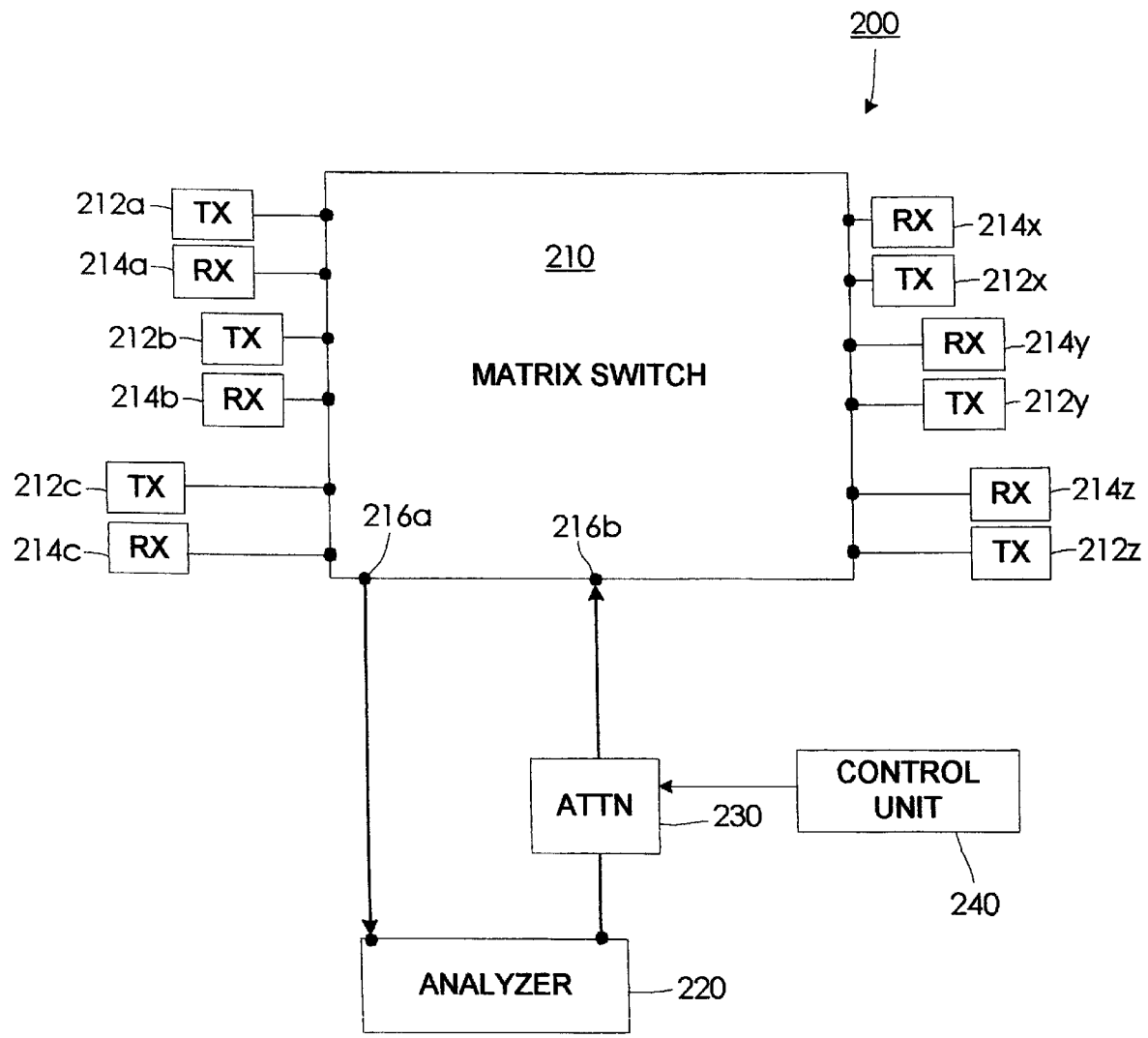
FIG. 2 is a schematic diagram of a second embodiment of the invention, in which only the output of the analyzer employs an attenuator.

As shown in FIG. 2, in one embodiment 200 of the invention, it is assumed that the analyzer 220 is capable of handling any signal level received from any of the transmission stations 212a–z (collectively 212) through the first port 216a of the matrix switch 210 and the primary concern is that the regenerated signal from the analyzer 220 could overwhelm the reception stations 214a–z (collectively 214). Therefore only one attenuator 230 per analyzer 220 is employed, which optically couples the output of the analyzer 220 to the second port 216b. The control unit 240 operates in the manner disclosed above, however it controls only one attenuator 230 for each analyzer 220. (Again even though FIG. 2 shows a single analyzer 220 for the sake of simplicity, actual embodiments could employ a plurality of analyzers 220 without departing from the scope of the invention.)

Figure 3:
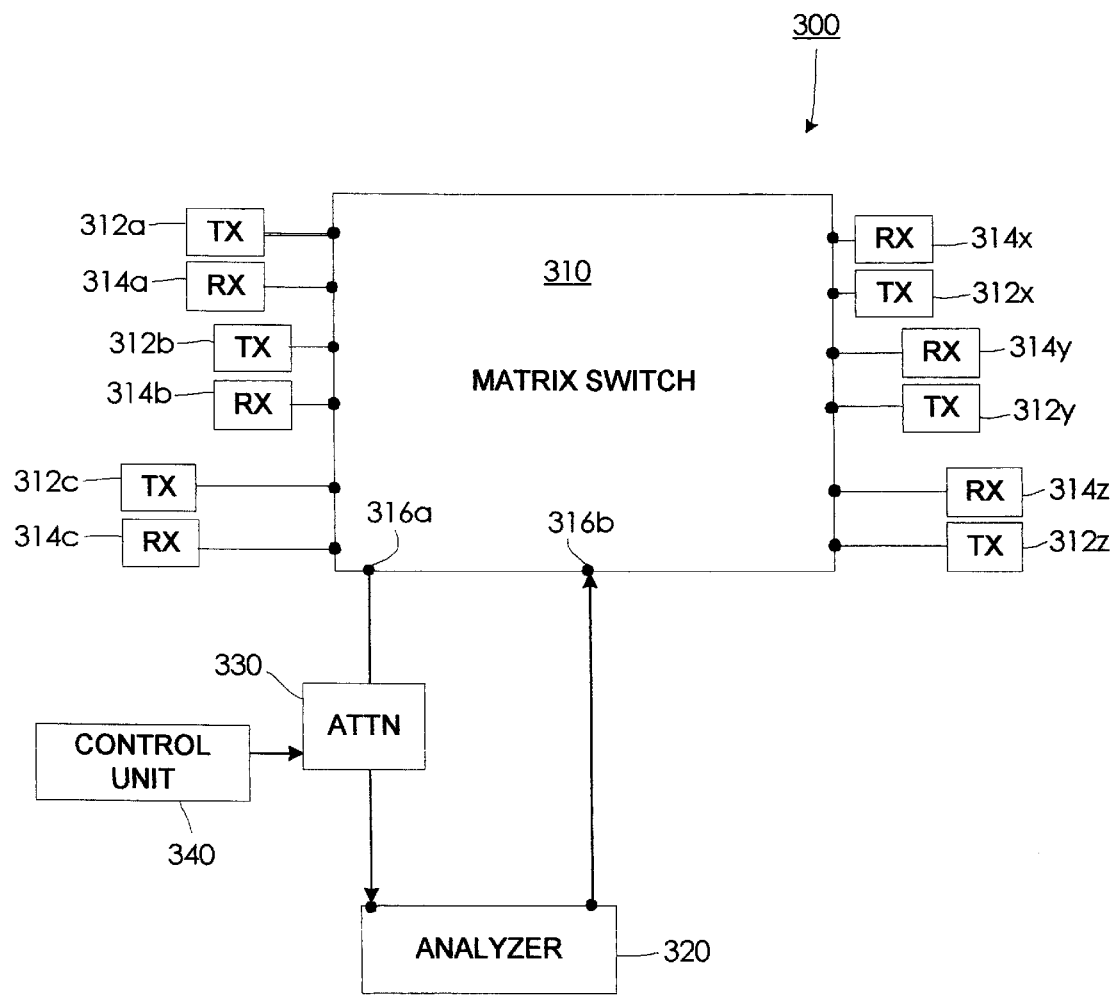
FIG. 3 is a schematic diagram of a third embodiment of the invention, in which only the input of the analyzer employs an attenuator.

As shown in FIG. 3, in another embodiment 300 of the invention, the concern is not the effect of the regenerated signal from the analyzer 320 on the reception stations 314a–z (collectively 314), but the effect of the varying signal strengths of signals from the transmission stations 312a–z (collectively 312) on the analyzer 320. In this embodiment 300, an attenuator 330, controlled by a control unit 340, optically couples the analyzer 320 to the first port 316a of the matrix switch 310 so as to allow attenuation of incoming signals from the transmission station 312. No attenuator couples the analyzer 320 to the second port 316b. This embodiment 300 would be employed where the input of the analyzer 320 is relatively sensitive to signal level, whereas the reception stations 314 is relatively less sensitive to signal level. (Again even though FIG. 3 shows a single analyzer 220 for the sake of simplicity, actual embodiments could employ a plurality of analyzers 220 without departing from the scope of the invention.)

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for controlling attenuation of optical signals routed through a matrix switch capable of optically coupling a selected transmission station, of a plurality of transmission stations, to a first port and optically coupling a second port to a reception station, the apparatus comprising:

a. a first variable attenuator optically coupled to the first port so that an optical path length exists between the first variable attenuator and the transmission station;

b. an optical analyzer having an input port and an output port, the input port optically coupled to the variable attenuator and the output port optically coupled to the second port, the input port being in optical communication with the first port through the first variable attenuator; and c. a control unit that controls the first variable attenuator, so as to cause an optical signal passing therethrough to be attenuated by a predetermined amount based on the optical path length between the transmission station and the first variable attenuator so that the optical signal entering the input port has a signal strength within a predetermined range.

2. The apparatus of claim 1, further comprising a second variable attenuator, the output port being optically coupled to the second port through the second variable attenuator.

3. The apparatus of claim 2, wherein the control unit controls the first variable attenuator and the second variable attenuator.

4. The apparatus of claim 1, wherein the control unit comprises:

a. a look LIP table that includes a plurality of data units, each data unit indicating an amount of attenuation necessary to cause the optical signal exiting the first variable attenuator to have a signal strength within the predetermined range; and b. a circuit that converts a data unit from the look up table to a signal that controls the variable attenuator.

5. The apparatus of claim 4, wherein the look up table is addressed by using an address comprising an indicator of which selected transmission station of the plurality of transmission stations is optically coupled to the first port.

6. The apparatus of claim 4, wherein the look up table is addressed by using an address comprising an indicator of the optical path length between the selected transmission station and the variable attenuator.

7. The apparatus of claim 4, where the look up table is addressed by using an address comprising an indicator of the signal strength of the optical signal as the optical signal enters the variable attenuator.

8. An apparatus for controlling attenuation of optical signals routed through a matrix switch capable of optically coupling a transmission station to a first port and coupling a second port to a selected reception station of a plurality of reception stations, the apparatus comprising:

a. a variable attenuator optically coupled to the second port so that an optical path length exists between the variable attenuator and reception station;

b. an optical analyzer having an input port and an output port, the input port optically coupled to the first port and the output port optically coupled to the variable attenuator, the output port being in optical communication with the second port through the second variable attenuator; and c. a control unit that controls the variable attenuator, so as to cause an optical signal passing therethrough to be attenuated by a predetermined amount based on the optical path length between the variable attenuator and the reception station so that the optical signal entering the second port has a signal strength within a predetermined range.

9. The apparatus of claim 8, wherein the control unit comprises:

a. a look up table that includes a plurality of data units, each data unit indicating an amount of attenuation necessary to cause the optical signal entering the second port will to a signal strength within the predetermined range; and b. a circuit that converts a data unit from the look up table to a signal that controls the variable attenuator.

10. The apparatus of claim 9, wherein the look up table is addressed by using an address comprising an indicator of which selected reception station of the plurality of reception stations is optically coupled to the second port.

11. The apparatus of claim 9, wherein the look up table is addressed by using an address comprising an indicator of the optical path length between the selected reception station and the variable attenuator.

12. The apparatus of claim 9, where the look up table is addressed by using an address comprising an indicator of the signal strength of the optical signal as the optical signal enters the second port.

13. An apparatus for the controlling attenuation of optical signals routed through a matrix switch capable of optically coupling a selected transmission station of a plurality of transmission stations to a first port and coupling a second port to a selected reception station of a plurality of reception stations, the apparatus comprising:

a. a first variable attenuator optically coupled to the first port, an optical path length existing between the first variable attenuator and transmission station;

b. a second variable attenuator optically coupled to the second port, an optical path length existing between the second variable attenuator and the reception station;

c. an optical analyzer having an input port and an output port, the input port optically coupled to the first variable attenuator so that the input port is in optical communication with the first port through the first variable attenuator and the output port optically coupled to the second variable attenuator so that the output port is in optical communication with the second port through the second attenuator;

d. a control unit that controls the first variable attenuator and the second variable attenuator, so as to cause an optical signal passing through the first variable attenuator to be attenuated by a first predetermined amount based on the optical path length between the transmission station and the first variable attenuator so that the optical signal entering the input port has a signal strength within a first predetermined range and so as to cause an optical signal passing through the second variable attenuator to be attenuated by a second predetermined amount based on the optical path length between the second variable attenuator and the reception station so that the optical signal entering the second port has a signal strength within a second predetermined range;

e. a look Up table having a plurality of data units, each data unit indicating an amount of attenuation required so that the optical signal entering the first variable attenuator has a signal strength within the first predetermined range and the optical signal existing the second variable attenuator has a signal strength within the second predetermined range; and f. a circuit that converts a data unit from the look up table to a first signal that controls the first variable attenuator and a second signal that controls the second variable attenuator.

14. An apparatus for the controlling attenuation of optical signals routed through a matrix switch capable of optically coupling a selected transmission station of a plurality of transmission stations to a first port and coupling a second port to a selected reception station of a plurality of reception stations, the apparatus comprising:

a. means for receiving an optical signal from a transmission station;

b. means for determining an amount of attenuation of the optical signal that will cause the optical signal to have a signal strength within a predetermined range;

c. means for attenuating the optical signal by the amount of attenuation, and for generating an attenuated optical signal; and d. means for transferring the attenuated optical signal to the optical analyzer.

15. A method of attenuating an optical signal being input into an optical analyzer, the method comprising the steps of:

a. receiving an optical signal from a transmission station;

b. determining an amount of attenuation of the optical signal that will cause the optical signal to have a signal strength within a predetermined range;

c. attenuating the optical signal by the amount of attenuation, thereby generating an attenuated optical signal; and d. transferring the attenuated optical signal to the optical analyzer.

16. A method of attenuating an optical signal being transmitted from an optical analyzer to a reception station, the method comprising the steps of:

a. receiving an optical signal from an optical analyzer;

b. determining an amount of attenuation of the optical signal that will cause the optical signal to have a signal strength within a predetermined range;

c. attenuating the optical signal by the amount of attenuation, thereby generating an attenuated optical signal; and d. transferring the attenuated optical signal to the reception station.

* * * * *